(12) United States Patent
Ducret

(10) Patent No.: US 10,164,413 B2
(45) Date of Patent: *Dec. 25, 2018

(54) CABLE STRIPPER

(71) Applicant: Southwire Company, LLC, Carrollton, GA (US)

(72) Inventor: Lucien C. Ducret, Old Greenwich, CT (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,991

(22) Filed: Jul. 25, 2017

(65) Prior Publication Data

US 2017/0324226 A1 Nov. 9, 2017

Related U.S. Application Data

(63) Continuation of application No. 13/136,928, filed on Aug. 16, 2011, now Pat. No. 9,748,748.

(51) Int. Cl.
*H02G 1/12* (2006.01)

(52) U.S. Cl.
CPC .................. *H02G 1/1229* (2013.01)

(58) Field of Classification Search
CPC ................................................ H02G 1/1229
See application file for complete search history.

(56) References Cited

U.S. PATENT DOCUMENTS

| 2,346,227 | A |  | 4/1944 | Martin et al. |
| 2,778,105 | A |  | 1/1957 | Carta |
| 3,665,603 | A |  | 5/1972 | Bilbrey et al. |
| 3,826,001 | A |  | 7/1974 | Bilbrey et al. |
| 4,489,490 | A |  | 12/1984 | Michaels et al. |
| 5,301,426 | A |  | 4/1994 | Regan |
| 5,487,220 | A |  | 1/1996 | Saitou |
| 5,809,652 | A |  | 9/1998 | Ducret |
| 6,073,349 | A |  | 6/2000 | Liversidge |
| 6,308,417 | B1 |  | 10/2001 | Ducret |
| 9,748,748 | B2 | * | 8/2017 | Ducret ................. H02G 1/1229 |
| 2004/0055160 | A1 |  | 3/2004 | Ducret |
| 2013/0042483 | A1 |  | 2/2013 | Ducret |
| 2017/0324226 | A1 | * | 11/2017 | Ducret ................. H02G 1/1229 |

* cited by examiner

*Primary Examiner* — Hwei C Payer
(74) *Attorney, Agent, or Firm* — Eric J. Sosenko; Jonathan P. O'Brien; Honigman Miller Schwartz and Cohn LLP

(57) ABSTRACT

A cable stripper having a displaceable blade carriage, which is normally biased toward a cable support to automatically accommodate differently dimensioned jacketed cables in a desired position. The blade carriage supports a blade assembly configured so that the blade can be displaced among multiple positions, corresponding to respective axial, radial and a plurality of spiral cuts, while the cable is engaged in the desired position.

12 Claims, 2 Drawing Sheets

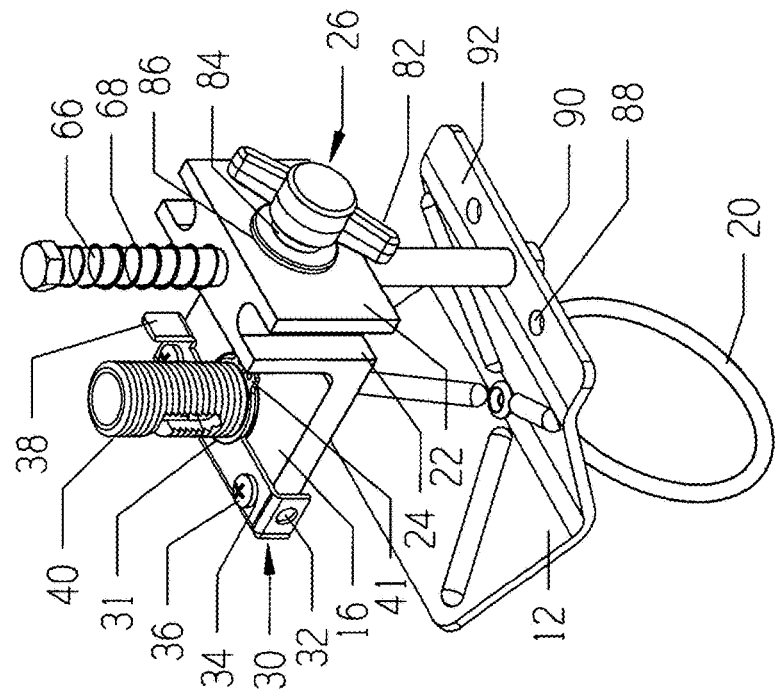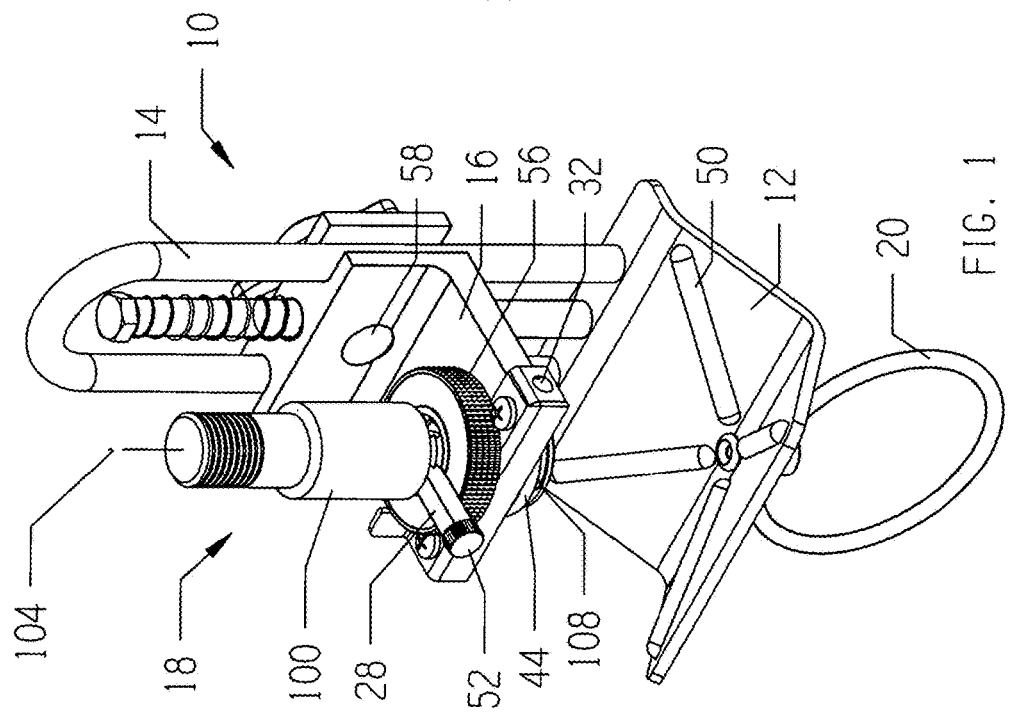

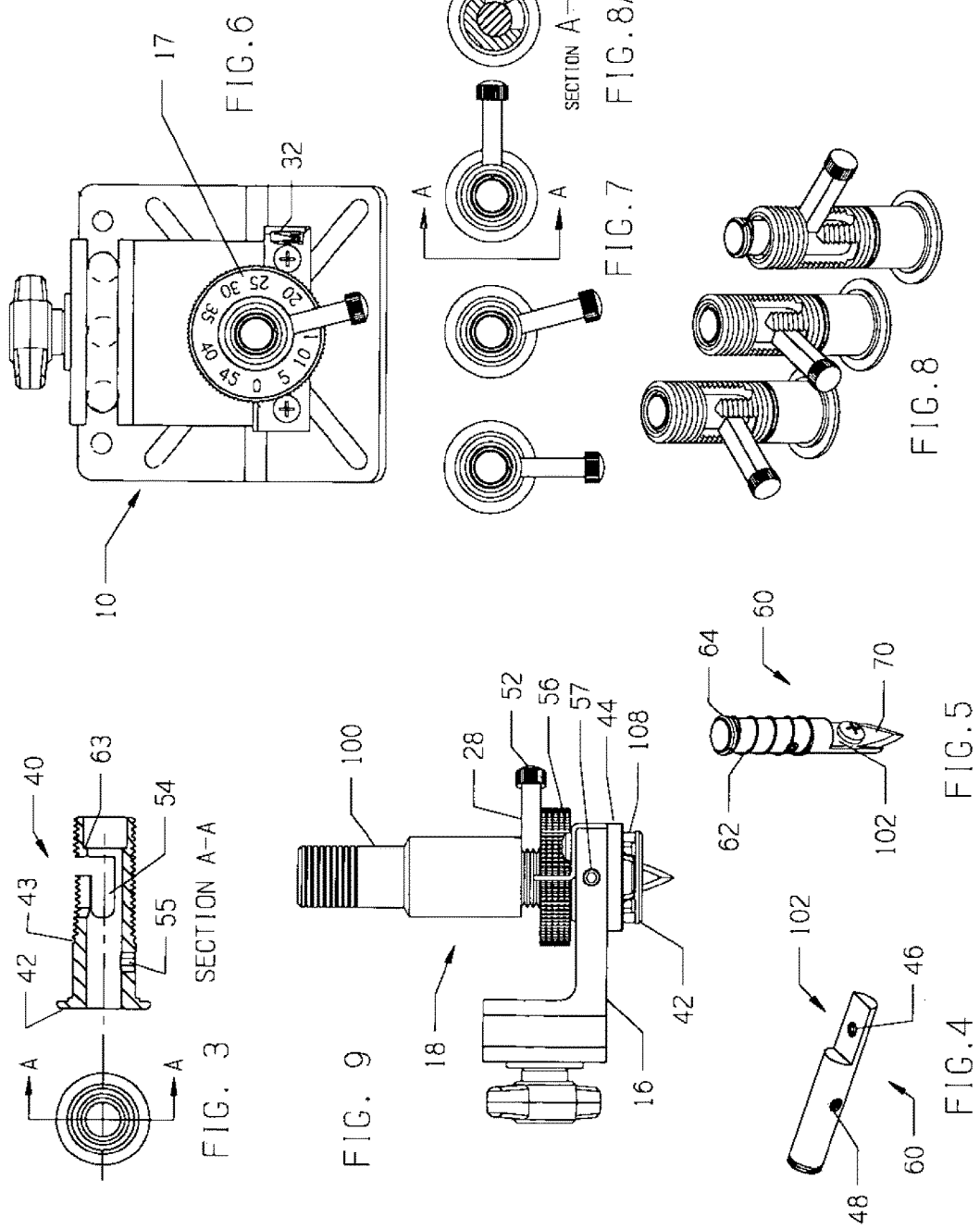

CABLE STRIPPER

CROSS REFERENCE TO RELATED APPLICATION

This application is a continuation of U.S. application Ser. No. 13/136,928, filed Aug. 16, 2011, now U.S. Pat. No. 9,748,748, the entire contents of which are herein incorporated by reference.

BACKGROUND OF THE INVENTION

1. Field of the Invention

The invention relates to cutting tools, and in particular, to a portable cable stripper automatically adjustable so as to accommodate differently dimensioned jacketed cables.

2. Background of Technological Field

U.S. Pat. No. 6,308,417 (U.S. Pat. No. '417), which is commonly owned with the present application and incorporated herein by reference, discloses a cable stripper operative to accommodate a great variety of differently-dimensioned cables. However, the cable stripper disclosed in this patent has a complex structure associated with a relatively high manufacturing cost.

U.S. Patent Application Publication No. 2004/0055160 (PA '160), like US '417, is commonly owned with this application, herein incorporated by reference and discloses a cable stripper operative to provide jacket stripping for differently dimensioned cables. The configuration of the disclosed cable stripper is relatively simple and allows for an axial cut, i.e., along a cable, and a radial cut. The configuration further allows for a spiral cut of cable. However the spiral cut can be realized only by first dismounting the stripper from the cable to be processed and then fully disassembling the tool in order to manually displace the blade in the desired position. The disclosed cable stripper, thus, is inconvenient for producing a spiral cut and contradicts one of the advantages of this tool, i.e. its capability of changing the angular position of the blade without disengaging the cable stripper from the cable to be processed.

It is, therefore, desirable to provide a cable stripper having a simple structure allowing for providing axial, radial and spiral cuts in a simple and efficient manner.

SUMMARY OF THE INVENTION

The disclosed portable cable stripper has a simple configuration allowing for a spiral cut in a simple manner which does not require the disassembly of the entire tool.

The cable stripper is configured with a blade assembly slideable along a device axis at a distance corresponding to the desired depth of penetration of the cable stripper's blade into the cable to be processed. The blade assembly includes a blade holder received in a blade housing which, in turn, is surrounded by a blade cap so that all three components are coaxially disposed.

The blade housing is structured with a U-shaped guide pocket having two side channels separated from one another by a third channel that bridges the side channels. The pocket is traversed by a lever fixed to the blade holder and guided along all channels by the operator so as to displace the blade in the desired extreme positions corresponding to respective axial and radial cuts.

At least one of the side channels is shaped and dimensioned to allow the blade to move radially to a position in which the blade is located between two extreme positions. Such a position would allow for a spiral cut. Moreover, an angle at which the blade is angularly displaced can be monitored.

BRIEF DESCRIPTION OF THE DRAWINGS

The disclosed tool will become more readily apparent when reference is made to the following description taken in conjunction with the accompanying drawings, in which:

FIG. 1 is an isometric view of the cable stripper in accordance with the present invention.

FIG. 2 is an isometric view a portion of the inventive cable stripper illustrating cable guide and blade carriage assemblies.

FIG. 3 is an isometric view of a blade housing.

FIG. 4 is an isometric view of a blade holder.

FIG. 5 is an isometric view of the blade assembly having a biasing component in a relaxed state.

FIG. 6 is a top view of the disclosed cable stripper of FIGS. 1 and 2.

FIG. 7 illustrates numerous positions of the blade corresponding to radial, spiral and axial cuts.

FIG. 8 illustrates three isometric views corresponding to the position of the blade as shown in FIG. 7.

FIG. 8A is a cross section of recess provided in a blade assembly for guiding the blade to the desirable angular position corresponding to one of axial, radial or spiral cut.

FIG. 9 is a left side view of the blade assembly and a carriage supporting the former and displaceable along the disclosed cable stripper at the desired depth of the blade's penetration.

SPECIFIC DESCRIPTION

Referring to FIGS. 1-2, a portable cable stripper 10 includes a V-shaped cable support 12 for receiving a cable to be stripped, a guide column 14 removably attached to cable support 12, a blade-holding carriage 16 slideable along guide column 14 and a guide assembly including a handle 20, which is attached to an outer side of the cable support.

The portable cable stripper is a labor-saving tool adjustable to remove jackets from rigid fiber optic and plastic jacketed cables having an outer diameter which may vary from about 3/16 of an inch to 2 inches. In operation, the user initially sets the desired depth at which a blade penetrates the jacket of the cable. Following it, the blade carriage 16 is pulled outwards from the V-shaped cable support 12 to form a space sufficient to receive the cable. Once the cable is placed on the cable support, blade carriage 16 slides towards and presses against the periphery of the jacket under the spring force so that the cable is locked between cable support 12 and blade carriage 16.

In accordance with the disclosure, a blade may be adjusted to provide longitudinal, radial and spiral cuts through the jacket of the clamped cable. Similarly to the cable stripper of PA '160, commonly owned with the present application, the cable to be processed remains clamped while, for example, the blade is displaced from a position corresponding to the axial cut to a position corresponding to the radial cut. In contrast to PA '160, the cable may be clamped while the blade is displaced to the desired angular position corresponding to a spiral cut which can be realized by a blade assembly 18. (FIG. 9)

Referring to FIGS. 2, 4 and 5, blade assembly 18 includes, among others, a hollow blade housing 40 (FIG. 2), a blade holder 60 (FIG. 4) supporting a blade 70 (FIG. 5) which is removably attached to holder 60 by a screw engaging a threaded recess 46 (FIG. 4) in the holder. The blade housing 40 (FIG. 2) extends through an opening formed in blade carriage 16 and has a hollow interior receiving the blade holder 60 which is sized to controllably rotate within the blade housing, as will be explained below. The periphery of the blade housing 40 is threaded to mesh with a threaded inner surface of a blade cap 100 (FIG. 1), which also acts as a lock.

A U-shaped guide pocket (FIGS. 2, 3 and 8) formed in the peripheral wall of the blade housing 40 provides a guide channel for a lever 28 (FIGS. 1 and 7), which is removably fixed to blade holder 60 (FIG. 4) by a thumb-screw 52 (FIGS. 1, 9) engaging a hole 48 of blade holder 60 (FIG. 4). Displacing lever 28 between two side channels (FIGS. 3 and 8) causes the blade to turn at 90 degrees from, for example, the axial cut position to the position of the radial cut. At least one side channel, for instance side channel 54, is configured so that lever 28 is operative to angularly move within it at an angle smaller than 90 degrees. Preferably, channel 54 has a frustoconical shape widening towards the bottom thereof, which may be curved or flat. The displacement of the blade may be controllable, i.e., a scale 17 (FIG. 6) indicates angle at which the blade 70 (FIG. 5) is displaced from the extreme position. Once the desired angle, for example, 5, 10 or 15 degrees, is established, and with dial 56 pre-adjusted to the proper blade penetration matching the cable jacket size, cap lock 100 (FIG. 1) is tightened over lever 28 (FIG. 9). As a result, blade holder 60 (FIG. 5) is adjusted to penetrate the cable's jacket at the desired angle.

Returning to FIGS. 1 and 2, displacement of the carriage 16 toward the cable to be stripped is caused by a spring 68 mounted on a central post 66, better shown in FIG. 2, and biasing the blade carriage towards cable support 12. The post. 66 is removably mounted on one side of the cable support and traverses a central hole formed in a flange 22 of carriage 16, which, thus, has an L-shape. The post further has a thickened outer end configured to form a seat for the outer end of spring 68, the opposite end of which urges against flange 22 of the blade guide so as to push the latter towards the cable placed on the cable support.

The desired axial position of carriage 16 can be registered by a carriage lock 26 provided with a screw 84 and washer 86, which are actuated by a handle 82 so that the screw 84 engages a threaded portion of locking cylinder 58 (FIG. 1). The desired position is ensured when the locking cylinder 58 is pulled against the central post 66.

The guide recesses 24 formed on the opposite sides of the flange 22 provide linear displacement of the blade carriage in a plane perpendicular to a tangent to the periphery of a circular cable. Preferably, the bottoms of the guide recesses 24 each have a respective surface extending complementary to a peripheral surface of the side posts of the guide column 14, which are, as shown in FIG. 1, are tubular. However, the cross-section of the posts is not limited to any particular configuration and may be, for example, polygonal.

The assembly of the cable stripper 10 is simplified by attaching inner ends of the side posts of the guide column 14 (FIG. 1) and of the central post 66 (FIG. 2) to a flange 92 of the cable support 12 by fasteners 90 extending through openings 88, which are provided on the flange 92. The guide recesses 24, better illustrated in FIG. 2, are laterally open to facilitate the installation of the guide column 14, which is U-shaped and, thus, features a loop easily engageable by the user's fingers during the transportation of the cable stripper. The bottoms of the guide recesses and the side holes 88 have a uniform radius and are aligned with one another to ensure that the guide column 14 extends substantially perpendicular to a plane in which the cable support 12 lies.

The carriage 16 carries a blade assembly 18 including a blade positioning dial ring 56 (FIG. 1), which is rotated by the user to establish a desired position corresponding to the desired depth of penetration of the blade into the jacket of the cable to be stripped. The dial ring 56 is operative to rotate to an initial position corresponding to a zero penetration of the blade 70 which is established when the zero "0" mark of the scale formed on the dial ring is juxtaposed with a top edge of index 38 (FIG. 2). A releasable ring lock 30, which is mounted on the side of the blade carriage opposite its flange 22, is operable for locking the dial ring in a position corresponding to the desired penetration of the blade. The ring lock 30 is a spring-biased structure, which, in a normal or locking position, prevents rotation of the dial ring 56, as will be explained below.

A resilient element of the ring lock, such as a spring 32 (FIG. 2), urges the ring lock 30 towards the locking position. The ring lock is substantially a plate-like element having a center recess 31 (FIG. 2) frictionally engaging the dial ring 56 in the locking position of the ring lock 30. In response to an external force, the ring lock 30 can move out of the locking position and release the dial ring 56, so that the latter can be further rotated the desired position corresponding to the selected depth of the blade penetration. Preferably, the index 38 is attached to the ring lock 30 and extends outwards from the blade carriage 16 to terminate flush with the scale for the convenience of the user. The dial ring 56 has a structured surface provided with alternating ribs and troughs slidably engaging a v-shaped edge of the index 38 to indicate the number of turns corresponding to the desired depth of the blade penetration into the cable's jacket. After the desired position has been set, an external force is ceased, and the ring lock returns to its locking position. The sliding motion of the ring lock 30 relative to the guide carriage 16 becomes possible due to a pair of spaced oblong holes 34 (FIG. 2) formed on the ring lock 30 and traversed by fasteners 36, which are removably attached to the blade carriage 16. The fasteners 36 are shaped and dimensioned so as to allow the ring lock's displacement, which is restricted only by the size of the holes.

Turning to FIGS. 4 and 5, the inner end 102 of the blade holder 60 is recessed to receive blade 70 removably attached to the inner end by a fastener and extending substantially flush with the rest of the blade holder. The outer end 64 of the blade holder provides a seat for one end of a spring 62, the other end of spring 62 lodges in a recess 63 (FIG. 3) of blade housing 40 which embraces a flange 44 (FIG. 1) attached to the inner side of the blade carriage 16 so that the spring 62 biases the blade holder 60 away from the cable support 12. The blade housing 40 (FIG. 2), thus, is kept secure by retaining ring 41 (FIG. 2) fitted in a circular groove 43. (FIG. 3) As a consequence, the user applies a force 104 (FIG. 1) overcoming the spring force and sufficient to guide the lever 28 along one of the side channels of the U-shaped guide pocket 54 (FIGS. 3 and 9) and extending beyond a flange 42 of the blade housing 40 exactly at the desired distance. The blade cap 100 is then screwed in on the blade housing 40 to lock the lever 28 between its inner surface and the opposing surface of the dial ring 56 and remains in this position during the cutting operation. The spring-biased structure of the blade holder allows the user to easily change the current cutting position of the blade 70 between axial and radial cuts without detaching the cable stripper 10.

If a cable to be processed in not round, a wave spring 108 (FIGS. 1 and 9) keeps the blade support in contact with this cable for constant blade penetration while the entire blade assembly is being adjusted. Axially, the blade assembly 18 is guidable by setting a point screw 57 in an oblong slot 55. Also, V-shaped support 12 (FIG. 1) has a plurality of guides 50 raising somewhat above the surface of the support and contributing to a reliable cut regardless of the imperfect shape of the cable to be processed. Finally, V-shaped support 12 may have two halves or a single U-shaped body. Preferably, the body of support 12 include a memory-shaped material providing certain uniformity for cable with uniform diameter.

While this disclosure has described various aspects of the present invention, the latter is not limited thereto, and is susceptible to numerous changes and modifications as known to those skilled in the art. Therefore, the invention is not limited to the details shown and described herein, and includes all such changes and modifications as are encompassed by the scope of the appended claims.

What is claimed is:

1. A cable stripper comprising:
   a cable support;
   a blade carriage biased toward the cable support so that a cable to be processed is engageable between the cable support and the blade carriage; and
   a blade assembly including a blade, the blade assembly being supported by the blade carriage so as to be operable for the blade to penetrate a jacket of the cable at a predetermined depth, the blade being axially moveable relative to the blade carriage while the cable is engaged between the blade carriage and the cable support, the blade also being rotationally moveable between a plurality of positions relative to the blade carriage while the cable is engaged between the blade carriage and the cable support, the plurality of positions being operable for the blade to produce cuts in a jacket of the cable corresponding to a radial cut, a plurality of spiral cuts and an axial cut, the plurality of positions corresponding to the radial cut, the plurality of spiral cuts and the axial cut defining an angular rotation of the blade of no more than 90 degrees.

2. The cable stripper according to claim 1, wherein the blade defines a longitudinal axis and the cable support defines a receiving space configured to receive the cable along an axis transverse to the longitudinal axis.

3. The cable stripper according to claim 2, wherein the blade is axially movable along the longitudinal axis.

4. The cable stripper according to claim 2, wherein the blade is rotationally movable about the longitudinal axis.

5. The cable stripper according to claim 1, wherein the cable support and the blade carriage are biased towards each other by a spring.

6. The cable stripper according to claim 1, further comprising a dial assembly rotatably coupled to the blade and configured to enable the blade to penetrate the jacket of the cable at the predetermined depth.

7. The cable stripper according to claim 1, wherein the cable support has a body configured with a V-shaped cross-section.

8. The cable stripper according to claim 1, wherein the cable support and the blade carriage are coupled together by a guide column, at least one of the cable support and the blade carriage being moveable relative to the guide column.

9. The cable stripper according to claim 1, wherein the blade assembly further includes a blade spring configured to bias the blade away from the cable support.

10. The cable stripper according the claim 1, wherein the blade is lockable in a desired position corresponding to one of the radial, spiral and axial cuts by the blade.

11. The cable stripper according to claim 1, further comprising a stop cooperating with the blade carriage to displaceably fix the blade in a desired position corresponding to one of the axial, radial and spiral cuts, the blade carriage being further provided with a scale indicating the desired position of the blade and a depth of a blade cut.

12. The cable stripper according to claim 1, further comprising a dial assembly rotatably mounted on the blade assembly and configured to enable the blade assembly to penetrate the jacket of the cable at the predetermined depth.

* * * * *